United States Patent [19]
Joglekar et al.

[11] Patent Number: 5,535,258
[45] Date of Patent: Jul. 9, 1996

[54] RADIO TELEPHONE INTERFACE APPARATUS FOR SPEED-DIALING OF TELEPHONE NUMBERS

[75] Inventors: Manohar A. Joglekar, Long Grove; Joseph F. Cramer, Jr., Crystal Lake; George M. Korycan, Union, all of Ill.

[73] Assignee: Motorola, Inc., Schaumburg, Ill.

[21] Appl. No.: 304,638

[22] Filed: Sep. 12, 1994

Related U.S. Application Data

[63] Continuation of Ser. No. 62,478, May 11, 1993, abandoned, which is a continuation of Ser. No. 733,914, Jul. 22, 1991, abandoned.

[51] Int. Cl.$^6$ .................................................. H04M 11/00
[52] U.S. Cl. ........................... 379/58; 379/354; 379/355
[58] Field of Search ................................ 379/58, 59, 67, 379/88, 354, 355

[56] References Cited

U.S. PATENT DOCUMENTS 4,644,107  2/1987  Clowes et al. ...................... 379/354

5,095,503  3/1992  Kawalski ............................. 379/354

FOREIGN PATENT DOCUMENTS 0023266  1/1987  Japan ..................................... 379/59
0023265  1/1987  Japan ..................................... 379/59

OTHER PUBLICATIONS

Mitsubishi International Corp., Model 1500 TPK, Jan. 1991.

Primary Examiner—Curtis Kuntz
Assistant Examiner—G. J. Oehling
Attorney, Agent, or Firm—Daniel W. Juffernbruch

[57] ABSTRACT

A radio telephone interface apparatus for speed dialing any of a plurality of stored sequences of digits forming telephone numbers. Pre-stored telephone numbers are stored in an electronic memory. Actuation of switches permits either sequential access to each of the stored telephone numbers or direct, nonsequential access to a desired set of stored telephone numbers. When the telephone numbers are sequentially access, mneumonic information associated with each one of the telephone numbers is provided to a voice synthesizer to provide an aural indication of the telephone numbers stored within individual ones of the directory locations.

14 Claims, 3 Drawing Sheets

RADIO TELEPHONE INTERFACE APPARATUS FOR SPEED-DIALING OF TELEPHONE NUMBERS

This is a continuation of application Ser. No. 08/062,478, filed May 11, 1993 and now abandoned, which is a continuation of application Ser. No. 07/733,914, filed Jul. 22, 1991 and now abandoned.

BACKGROUND OF THE INVENTION

The present invention relates generally to a cellular communication apparatus, and, more particularly, to a radio telephone interface apparatus permitting speed-dialing of sequences of digits forming telephone numbers.

A communication system is comprised, at a minimum, of a transmitter and a receiver interconnected by a communication channel. A radio communication system comprises one type of communication system wherein the communication channel interconnecting the transmitter and the receiver is formed of a radio frequency channel. No fixed connection is required between the transmitter and receiver of a radio communication system. Therefore, a radio communication system is advantageously utilized when a fixed connection between the transmitter and the receiver would be inconvenient or impractical.

A cellular, communication system is one type of radio communication system. In a cellular, communication system, numerous fixed-site transceivers, referred to as "base stations", are installed at spaced-apart locations throughout a geographical area. Each of the base stations contains circuitry to receive modulated signals transmitted thereto, and to transmit modulated signals therefrom. A radio telephone transmits the modulated signals to a base station, and a base station transmits the modulated signals to the radio telephone. The modulated signals are transmitted upon selected frequency channels allocated for such cellular communications.

A plurality of radio telephones may be operated simultaneously when the modulated signals transmitted by the different radio telephones are transmitted upon dissimilar frequency channels. (The modulated signals transmitted by base stations to the radio telephone are similarly transmitted upon dissimilar frequency channels.) As the power levels of the modulated signals generated by both the radio telephones and the base stations are relatively low, the same frequency channel may be reused throughout a geographical area to transmit the modulated signals between a radio telephone and a base station. In such manner, a cellular, communication system efficiently utilizes the frequency channels of the frequency band allocated for such use.

Technological improvements have decreased the cost associated with cellular communications. As a result, ever-increasing numbers of users make use of a cellular, communication system to communicate thereupon. Of particular popularity is the use of a radio telephone to communicate upon a cellular, communication system when the user is traveling in an automotive vehicle. Radio telephones constructed for installation within an automotive vehicle are conventionally referred to as mobile phones. As no fixed connection is required between the radio telephone and a base station, communication is permitted therebetween as long as the vehicle in which the radio telephone is positioned is within the geographical area encompassed by the cellular, communication system.

The steps required to be taken to effectuate a communication link between a radiotelephone and a base station, such as a mobile phone are quite similar to the steps required to be taken to effectuate communication when utilizing a telephone of a conventional, wire line system. Namely, a hook switch is released (conventionally occurring when a telephonic handset is removed from a base portion thereof), and a sequence of digits which form the telephone number are dialed or otherwise entered. The telephone number is associated with a particular telephone situated at a remote location.

Quite frequently, when the radio telephone is positioned in an automotive vehicle, the user of the phone is also the operator of the vehicle. When operating the vehicle, primary attention must be directed to that task, and only minimal attention may be allocated to taking the steps required to effectuate communication upon the cellular, communication system. Although the required step of dialing of a telephone number is not, of itself, a complex task, visual inspection of the telephone keypad is typically required of the user to ensure correct dialing of the telephone number. This visual inspection required to dial the telephone number detracts from the attention which must be directed to operating the automotive vehicle.

To minimize the usual inspection required to dial the telephone number, therefore, mobile phone constructions frequently include features to simplify the task of effectuating a communication link with a base station. For instance, the speaker and microphone, conventionally mounted upon a telephonic handset, are, in some mobile phone constructions, also fixedly mounted within the vehicular compartment of the automotive vehicle. Rather than holding a telephonic handset to position the speaker and microphone proximate to the user, the user may speak towards the microphone mounted in a fixed position in the vehicular compartment and listen to signals generated by the speaker similarly mounted in fixed position therein. Such a feature is frequently referred to as a "hands-free" feature permitting "hands-free" operation of the mobile phone.

Additionally, existing mobile phone constructions frequently include features to reduce the number of steps necessary to dial a telephone number. Analogous to conventional, wire line telephonic constructions permitting "speed-dialing", mobile phone constructions include features permitting such dialing of a telephone number. Conventionally, a switch is associated with a single telephone number, and when the switch is actuated, the telephone number associated therewith is dialed. When appropriately positioned in the vehicular compartment of the automotive vehicle, the operator of the automotive vehicle, upon memorizing the location of the switch, can dial the telephone number associated therewith by actuation of the switch. However, as the switch is associated with a single telephone number (i.e., there is a one-to-one correspondence between the switch and the telephone number), an increase in the number of telephone numbers which may be "speed-dialed" requires a corresponding increase in the number of switches. The location of each switch must be memorized to avoid the requirement of a user to inspect visually the location of the switch prior to actuation thereof. With each additional switch, the likelihood that the user, either as an impulse or as of necessity, must visually inspect the location of the switch prior to actuation thereof increases, as the user must both memorize the locations of the switches and the telephone numbers associated therewith to actuate a switch without first making a visual location thereof. As the attention of the operator of an automotive vehicle must be directed primarily to the operation of a vehicle, such a need or impulse to locate visually a switch prior to actuation thereof detracts from the operator's attention which should otherwise be directed towards operation of the automotive vehicle.

What is needed, therefore, is an improved interface apparatus for a radio telephone permitting speed-dialing of a desired number of pre-stored telephone numbers.

SUMMARY OF THE INVENTION

The present invention, therefore, advantageously provides an improved radio telephone interface apparatus permitting speed-dialing of a desired number of pre-stored telephone numbers.

The present invention further advantageously provides a mobile phone construction having an improved radio telephone interface apparatus permitting speed-dialing of a desired number of pre-stored telephone numbers.

The present invention provides further advantages and features, details of which will become more apparent by reading the detailed description of the preferred embodiments hereinbelow.

In accordance with the present invention, therefore, a radio telephone interface apparatus for speed-dialing any of a plurality of sequences of digits forming telephone numbers to effectuate a telephonic communication link with a remote location defined by specific ones of the telephone numbers is disclosed. A directory stores in directory locations thereof the plurality of sequences of digits forming the telephone numbers. A sequential-access, directory pointer sequentially accesses the directory locations of the directory and the telephone numbers stored therein. An interrupt-access, directory pointer nonsequentially accesses any of a selected group of the directory locations of the directory. The telephone numbers stored in the directory location accessed either by the sequential-access, directory pointer, or the interrupt-access, directory pointer is transmitted to effectuate thereby the telephonic communication link with the remote location.

BRIEF DESCRIPTION OF THE DRAWINGS

The present invention will be better understood when read in light of the accompanying drawings in which.

DESCRIPTION OF THE PREFERRED EMBODIMENTS

Figure 1:
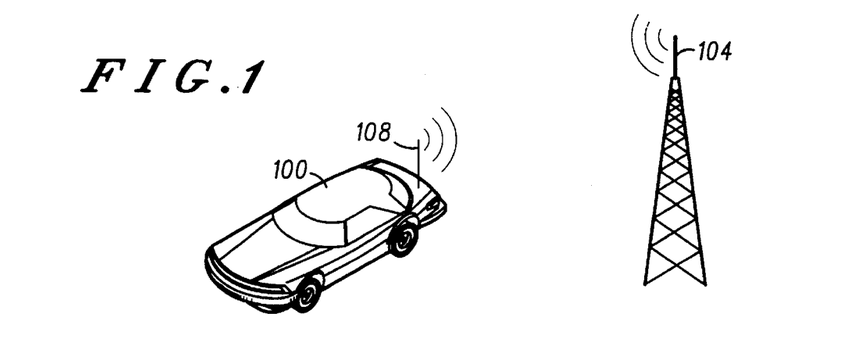
FIG. 1 is a schematic illustration of an automotive vehicle having a radio telephone positioned therein and a base station positioned remotely therefrom.

Referring first now to the schematic illustration of FIG. 1, an automotive vehicle 100 is positioned remote from a base station, indicated in the figure by antenna 104. Automotive vehicle 100 has positioned therein a radio telephone, represented in the Figure by antenna 108 which forms a portion of the radio telephone. Both the radio telephone and the base station contain circuitry for both transmitting and receiving modulated signals to effectuate two-way communication therebetween. As the communication channel connecting the radio telephone and base station is formed of radio frequency channels, no fixed connection between the radio telephone and the base station is required to effectuate communication therebetween. As long as the radio telephone and base station are within the reception range of one another, communication is permitted between the radio telephone and the base station.

Figure 2:
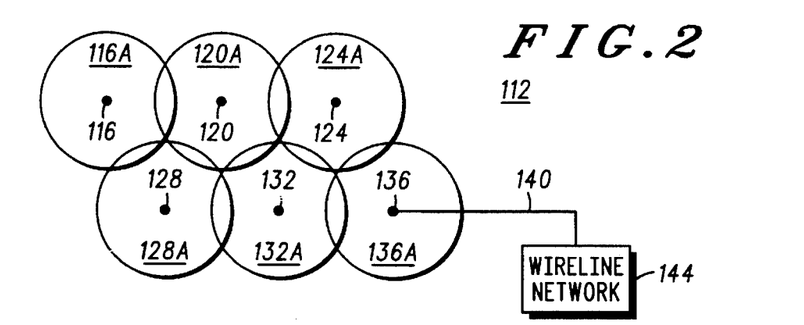
FIG. 2 is a schematic illustration of a portion of a cellular, communication system.

Referring next to FIG. 2, a portion of a cellular, communication system, referred to generally by the reference numeral 112, is graphically shown. A cellular, communication system is formed by the positioning of numerous base stations (of which one was represented in FIG. I by antenna 104) at spaced-apart locations throughout a geographical area. As mentioned previously, a base station contains circuitry both for transmitting a modulated signal therefrom and for receiving a modulated signal transmitted thereto. The base stations are indicated in FIG. 2 by points 116, 120, 124, 128, 132, and 136. While FIG. 2 illustrates six separate base stations indicated by points 116–136, it is to be understood, of course, that an actual, cellular, communication system is conventionally comprised of a large plurality of base stations. Each of the base stations 116–136 is coupled to a conventional, wire line, telephonic network. Such connection is indicated in FIG. 2 by line 140 interconnecting base station 136 and wire line network 144. Connections between wire line network 144 and other ones of the base stations 116–132, although not illustrated, may be similarly shown.

The positioning of the base stations 116–136 forming the cellular, communication system is carefully selected to ensure that at least one base station is positioned to receive a modulated signal transmitted by a radio telephone positioned at any location throughout the geographical area which is to be encompassed by the cellular system.

Because of the spaced-apart nature of the positioning of the base stations 116–136, portions of the geographical area throughout which the base stations 116–136 are located are considered to be associated with individual ones of the base stations. Portions of the geographical area approximate to each of the spaced-apart base stations 116–136 define "cells" which are represented in the figure by areas 116A, 120A, 124A, 128A, 132A, and 136A surrounding respective ones of the base stations 116–136. A cell defined thereby is of a size such that a base station associated therewith is within the transmission range of a radio telephone when positioned in the cell. Cells 116A–136A together define the geographical area encompassed by the cellular system. Because of the overlapping nature of the cells, a radio telephone positioned within the boundaries of any of the cells of the cellular, communication system may transmit, and receive, modulated signals to, and from, at least one base station 116–136.

As mentioned previously with respect to FIG. 1, a radio telephone is frequently positioned in an automotive vehicle, such as vehicle 100 of FIG. 1, to permit telephonic communication between a user in the vehicle and a remote location. Such remote location is typically a conventional telephonic apparatus coupled to the conventional wire line network (indicated by reference numeral 144 of FIG. 2), but may also comprise another radio telephone also positioned for operation in a cellular, communication system.

To effectuate telephonic communication, the user of the radio telephone releases the radio telephone hook switch, and dials a telephone number associated with a telephone which the user wishes to dial. The telephone number is transmitted to a base station. Such received, telephone number is, in turn, conveyed to the conventional, wire line network whereat conventional telephonic connections are completed. As mentioned hereinabove, because the user of the radio telephone positioned in the automotive vehicle may also be (and, in fact, is most frequently), the operator of the automotive vehicle, primary attention must be directed to the operation of the vehicle, and the steps required to effectuate the telephonic communication must be minimized.

In particular, as only a select few telephone numbers comprise the vast majority of telephone calls made by a user of a radio telephone, radio telephone constructions frequently include features to simplify the dialing of such number or numbers. For instance, as also mentioned hereinabove, a single switch may be associated with a single telephone number, and actuation of the switch causes automatic dialing of the telephone number. However, as a separate switch corresponds in a one-to-one correspondence with a telephone number, confusion can arise as to which switch is associated with a particular one of the telephone numbers. An operator of an automotive vehicle may, either by impulse or by necessity, visually inspect the locations of the switches prior to actuating a desired one of the switches. Such visual examination of actuation switches detracts the attention of the operator of the automotive vehicle and the primary attention which should be directed primarily to the operation of the vehicle.

Additionally, quite frequently, an automotive vehicle is operated alternately by more than one person. For instance, a single automotive vehicle is frequently operated, in some instances, by a husband, and, in other instances, by a wife. While each individual may make many telephone calls, the vast majority of such calls are generally made to only a few telephone numbers. The most-frequently dialed telephone numbers of each individual may, however, differ. In such instances, the telephone numbers pre-stored by the first individual to simplify telephone dialing may be of no benefit to the second individual.

Because of the conventional one-to-one correspondence between switches and pre-stored telephone numbers, and because of the confusion which results from an increase in the number of switches, an increase in the number of switches to increase the number of pre-stored telephone numbers is disadvantageous.

Accordingly, the radio interface apparatus of the preferred embodiment of the present invention, while permitting pre-storing of more than one telephone number, does not require a commensurate increase in the number of switches required to "speed-dial" a desired one of the telephone numbers.

Figure 3:
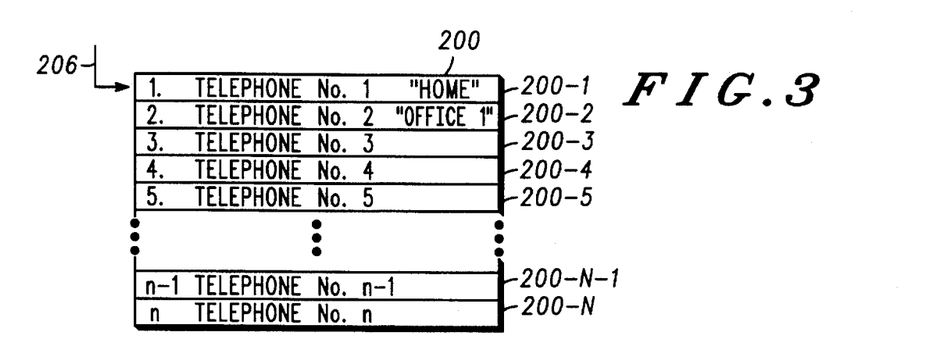
FIG. 3 is a pictorial illustration representative of a directory for storing a pre-determined number of telephone numbers and a directory pointer for accessing a desired one of the telephone numbers stored in directory locations of the directory.

Turning now to the pictorial illustration of FIG. 3, a directory 200 having directory locations 200-1, 200-2, . . . 200-N directory locations is represented. While directory 200 is preferably embodied in an electronic memory element, the directory is perhaps best visualized by the pictorial illustration of the Figure. The electronic memory may, for instance, comprise a portion of processor circuitry.

A sequence of digits forming a telephone number and a brief mneumonic indicative thereof is stored in each directory location 200-1 through 200-N. For instance, stored in directory location 200-1 is a sequence of digits forming a telephone number identifying a telephone located at a first, specific location. A mneumonic is further stored in the directory location 200-1 indicative of the telephone number stored therein. As illustrated, the telephone number stored in directory location 200-1 is associated with a "Home" location. Similarly, a sequence of digits forming a telephone number is stored in directory location 200-2 to identify a telephone located at another specific location. A mnemonic is similarly stored in directory location 200-2. As illustrated, the telephone number stored in directory location 200-2 is associated with an "Office #1" location.

A pointer, indicated in FIG. 3 by arrow 206 permits access to individual ones of the directory locations 200-1 to 200-N. When directory 200 is comprised of a conventional, electronic memory element, the pointer comprises conventional accessing means for accessing memory locations of the memory element which forms the directory.

Figure 4A:
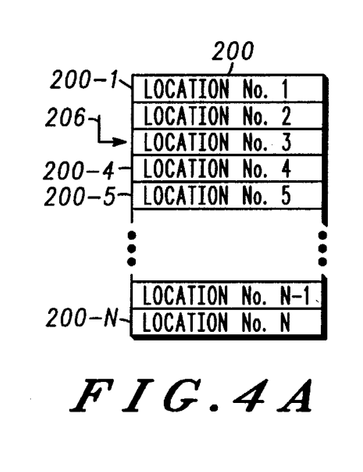
FIG. 4A is a pictorial illustration, similar to that of FIG. 3 which illustrates the directory pointer positioned to access another telephone number stored in a directory location of the directory.

Turning now to the pictorial illustration of FIG. 4A, directory 200 of FIG. 3 is again illustrated. Directory 200 is again shown to be comprised of directory locations 200-1 through 200-N. The pointer formed of arrow 206 is, however, positioned at directory location 200-3 to permit access to the information stored thereat.

Figure 4B:
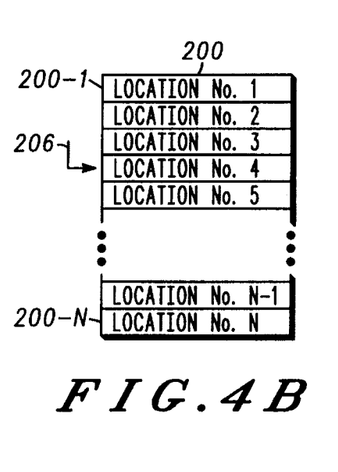
FIG. 4B is a pictorial illustration, similar to that of FIG. 4A, but illustrating the directory pointer when the directory pointer commences sequential accessing of a succeeding directory location of the directory.

FIG. 4B is a pictorial illustration, again of directory 200. Directory 200 is again illustrated to include directory location 200-1 through 200-N. The pointer represented by arrow 206 is positioned in the pictorial illustration of FIG. 4B at directory location 200-4 to access the information stored in directory location 200-4. Operation of the radio telephone interface apparatus of the preferred embodiment of the present invention, as will be described more fully hereinbelow, permits the pointer, indicated by arrow 206, to access sequential the directory locations 200-1 through 200-N.

Figure 4C:
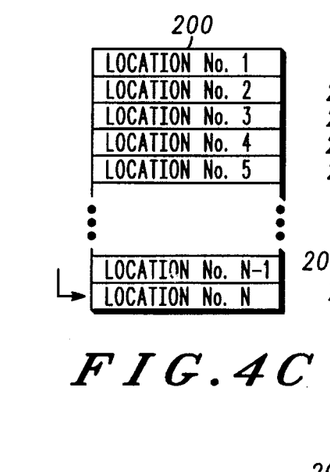
FIG. 4C is a pictorial illustration, similar to those of FIGS. 4A–B, but which illustrates the positioning of the directory pointer at a final directory location of the directory.

FIG. 4C is again a pictorial illustration of directory 200 forming directory locations 200-1 through 200-N. The pointer, indicated by arrow 206 is positioned at directory location 200-N to permit access to the information stored therein. The pointer is repositioned sequentially and iteratively at the directory locations of directory 200 such that at the nth increment thereof, the directory pointer is positioned at directory location 200-N of directory 200.

Figure 4D:
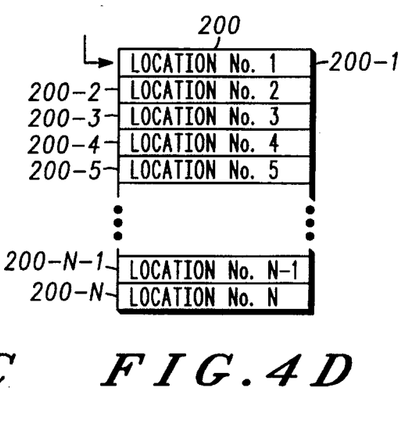
FIG. 4D is a pictorial illustration, similar to those of FIGS. 4A–C, but which illustrates sequential positioning of the directory pointer at a directory location subsequent to positioning of the directory pointer at the final directory location of the directory.

FIG. 4D again illustrates pictorially directory 200 having directory locations 200-1 through 200-N. The pointer, indicated by arrow 206, is positioned at directory location 200-1 to permit access to the information stored therein. Positioning of the pointer to access the information located at directory location 200-1 in FIG. 4D is illustrated proximate to the pictorial illustration of FIG. 4C (and positioning of the pointer at directory location 200-N) to represent scrolling of the pointer to reiterate sequentially through the directory location of directory 200 subsequent to positioning of the pointer at directory location 200-N. In essence, the pointer sequences repeatedly through the directory locations 200-1 through 200-N of the directory 200, and subsequent to positioning of the pointer at the final directory location (directory location 200-N), the pointer returns to the first directory location (directory location 200-1) to repeat sequential access to the directory locations 200-1 through 200-N thereby.

Figure 5:
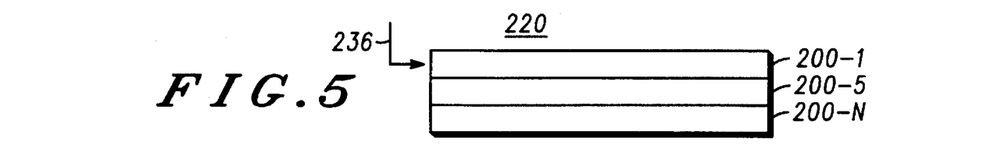
FIG. 5 is a pictorial illustration representing three directory locations which may be accessed by a first interrupt-access directory pointer of the present invention.

Turning now to the pictorial illustration of FIG. 5, three selected directory locations are pictorially illustrated. The three directory locations, here directory locations 200-1, 200-5, and 200-N together form a set referred to by reference numeral 220. The directory locations of set 220 each contain information including sequences of digits forming a telephone number and mnemonics associated therewith similar to those shown respect to FIGS. 3 and 4A–D. As again will be described more fully hereinbelow, the radio telephone interface apparatus of the preferred embodiment of the present invention is also operative such that a pointer accesses a pre-selected group of directory locations (here directory location 200-1, 200-5, and 200-N) in a nonsequential manner, that is, the directory locations forming set 220 may be accessed without sequencing through each of the directory locations 200-1 through 200-N, as described with respect to FIGS. 4A–4D.

Figure 6:
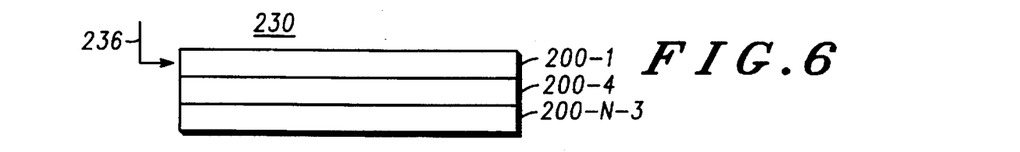
FIG. 6 is a pictorial illustration, similar to that of FIG. 5, but illustrating three directory locations which may be accessed by a second interrupt-access, directory pointer of the present invention.

FIG. 6 is a pictorial illustration, similar to that of FIG. 5, wherein three selected directory locations are pictorially illustrated. The three directory locations, here directory locations 200-1, 200-4, and 200-N-3 together form a set, referred to by reference numeral 230. The directory locations of set 230 each contain information including sequences of digits forming a telephone number and a mneumonic associated therewith similar to those shown with respect to FIGS. 3 and 4A–4D. As again will be described more fully hereinbelow, the radio telephone interface apparatus of the present invention may also be operated such that a pointer accesses a pre-selected group of directory locations (here directory locations 200-1, 200-4, and 200-N-3 ) in a nonsequential manner, that is, the directory locations forming set 230 may be accessed without sequencing through each of the directory locations 200-1 through 200-N as described with respect to FIG. 3 hereinabove.

Figure 7A:
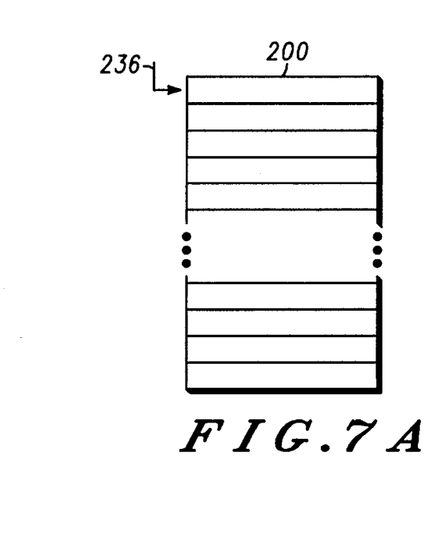
FIG. 7A–C are pictorial illustrations representing the positioning of the interrupt-access, directory pointer accessing the three directory locations of the directory indicated in FIG. 6.
Figure 7B:
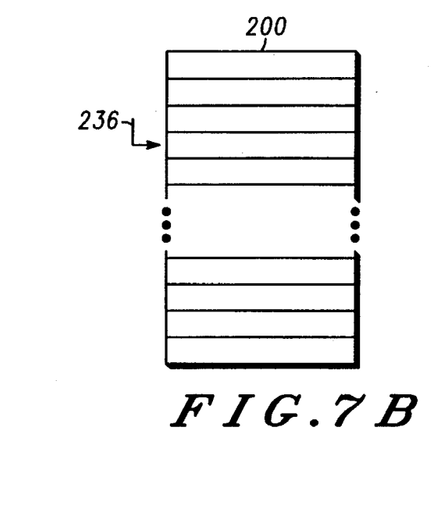
Figure 7C:
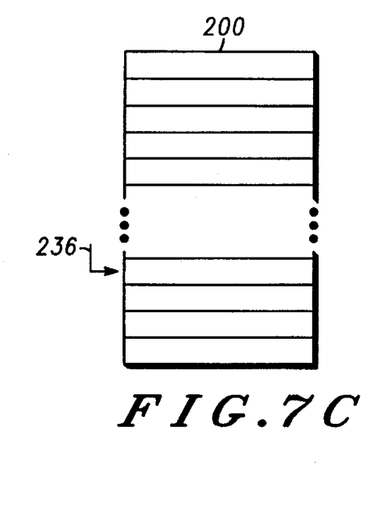

Turning now to FIG. 7A, 7B, and 7C, a directory pointer, here referred to by reference numeral 236 is positioned to access, in FIG. 7A, directory location 200-1; in FIG. 7B, directory location 200-4; and in FIG. 7C, directory location 200-N-3. The directory locations accessed by the pointer indicated by arrow 236 in the respective ones of the FIGS. 7A–7C correspond to the directory locations forming set 230 of FIG. 6. Rather than sequencing through each of the directory locations 200-1 through 200-N, the selected group of directory locations forming set 230 may be directly accessed without sequencing through intervening ones of the directory locations.

Figure 8:
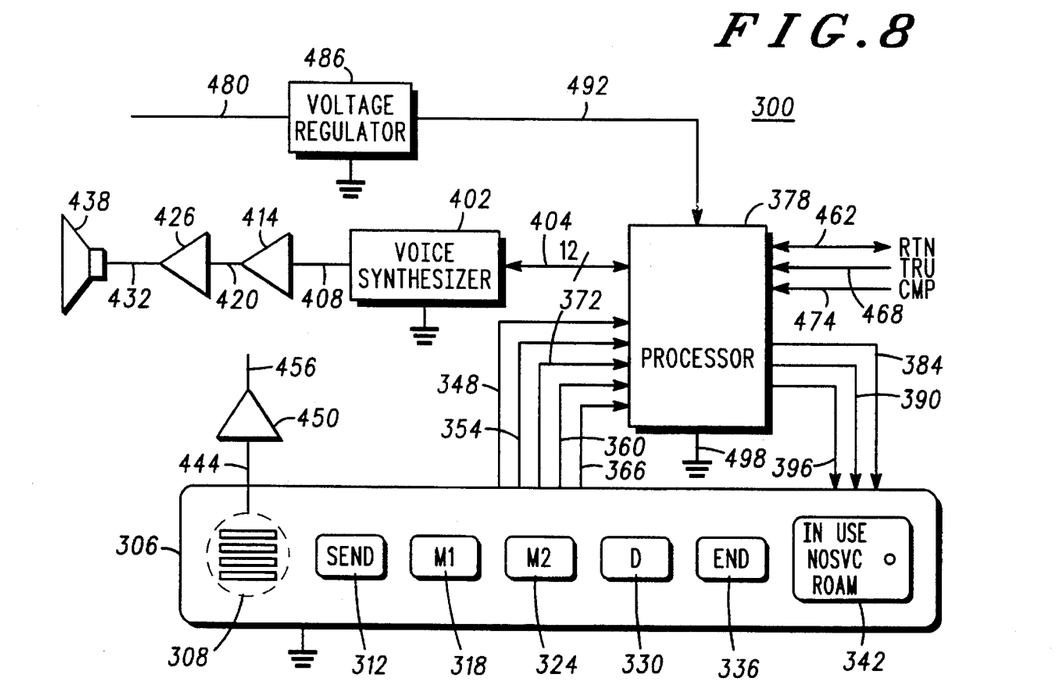
FIG. 8 is a block diagram of the radio interface apparatus of a preferred embodiment of the present invention.

FIG. 8 is a block diagram of the radio telephone interface apparatus, referred to generally by reference numeral 300, of a preferred embodiment of the present invention. Apparatus 300 includes keypad 306 having a microphone, indicated by circle 308, shown in hatch, mounted thereupon, send key 312, M1 key 318, M2 key 324, directory (D) key 330, end key 336, and light emitting diode (LED) display 342. Keys 312–336 form actuation switches which are actuated upon depression of the respective ones of the keys 312–336.

Lines 348, 354, 360, 366, and 372 are coupled at first ends thereof to respective ones of the keys 312–336, and at second ends thereof to input ports of processor 378. More particularly, line 348 interconnects send key 312 and processor 378; line 354 interconnects key 318 and processor 378; line 360 interconnects key 324 and processor 378; line 366 interconnects key 330 and processor 378; and line 372 interconnects key 336 and processor 378. Actuation of any of the keys 312–336 is thereby indicated as signals indicative of such actuation of keys 312–336 form inputs to processor 378.

Lines 384, 390, and 396 interconnect output ports of processor 378 with LED display 342. Display 342 provides a visual indication of when a radiotelephone coupled thereto is in use, beyond range of a base station, or beyond the service area of the radio telephone. As such indications are conventional in nature, operation of display 342 will not be discussed further.

Additional output ports of processor 378 are additionally coupled to voice synthesizer 402. As illustrated, a 12-wire bus interconnects processor 378 and voice synthesizer 402. Voice synthesizer 402 is operative to generate a voice-synthesized signal on line 408 which is applied to amplifier 414. Amplifier 414, in turn, generates a signal on line 420 which is applied to second amplifier 426 which generates an amplified signal on line 432 which is supplied to speaker 438 thereby.

The microphone mounted upon display 306, and indicated by circle 308, shown in hatch, generates a signal on line 444 which is applied to an input of amplifier 450. Amplifier 450 generates an amplified signal on line 456 which is applied to external circuitry, not shown in the block diagram of FIG. 8.

Processor 378 is further shown to have lines 462, 468, and 474 which couple processor 378 to external circuitry, again, not shown in the block diagram of FIG. 3. Processor 378 is appropriately powered and grounded, as indicated by voltage line 480 supplying voltage to voltage regulator 486, which, in turn, supplies a regulated voltage on line 492 to the processor 378. Ground line 498 is additionally illustrated to indicate proper grounding of processor 378. Voltage regulator 486, voice synthesizer 402, and keypad 306 are also appropriately grounded.

Operation of interface apparatus 300 will be described in relation with FIGS. 1–7C described hereinabove. Apparatus 300 is operative to permit a user desiring to utilize a radio telephone to initiate dialing of a telephone number by merely depressing one or two of the keys 312–330. Because of the limited number of keys, a user may quickly learn the location of and operation of the keys. Therefore, apparatus 300 is particularly advantageous when utilized as a portion of a mobile phone as an operator is able both to operate an automotive vehicle and initiate the dialing of the telephone number without prior visual inspection of the location of the key.

Depression of directory key 330 actuates the key formed thereof. Such actuation generates a sequential-access, input signal on line 366 which is supplied to processor 378. Responsive to such signal, an algorithm embodied within processor 378 accesses a first directory location (with respect to FIGS. 3–7C hereinabove, a directory location 200-1 through 200-N is accessed responsive to initial positioning of the directory pointer formed of arrow 206). Once the mneumonic information stored in the first-accessed directory location is determined, signals are generated on bus 404 to voice synthesizer 402 which generates a signal which, subsequent to amplification thereof, is supplied to speaker 438. Speaker 438 generates an aural signal to identify the telephone number stored in the accessed, directory location. In response to such aural signal, if the user desires to initiate telephone dialing of the number in the accessed directory location, the user then depresses send key 312 to actuate the key formed thereof. Depression of send key 312 generates a signal on line 348 which is sensed by processor 378. Responsive thereto, processor 378 generates signals on lines 462–474 to transfer the telephone number stored in the accessed directory location to initiate telephone dialing of the accessed telephone number.

If the first-accessed directory location is not the telephone number desired to be dialed by the user, the user may repeat the process of depressing directory key 330 to actuate the key thereby, and to generate again the sequential-access signal on line 366. Responsive to such signal, processor 378 causes the sequential-access directory pointer to access incrementally a succeeding directory location. The mneumonic information stored in the next-accessed directory location is again generated on bus 400 and supplied to voice synthesizer 402. Voice synthesizer 402 generates a signal which, once amplified, is converted into an aural signal by speaker 438. Again responsive to such aural signal, if the user desires to initiate telephone dialing of the telephone number of the accessed directory location, the user depresses send key 312 to actuate the key thereby. Processor 378 is again operative to generate signals indicative of the telephone number of the accessed directory location on lines 462–474 to initiate telephone dialing of that telephone number.

The user of apparatus 300 may sequence through the directory locations of the directory by repeated depressions of directory key 330 until a desired directory location is accessed. Once the desired directory location is accessed, the send key 312 is depressed to initiate telephone dialing of the telephone number stored in the selected, directory location.

It is further noted that, in the preferred embodiment, an algorithm embodied within processor 378 is additionally operative to detect times when directory key 330 is depressed continually for at least a predetermined time period, such as, for example, six seconds. Such continual depression of key 330 is utilized in the preferred embodiment to cause automatic sequencing through the directory locations of the directory. That is, when directory key 330 is continuously actuated (rather than repeated, intermitted actuations of the key), processor 378 is operative to cause the sequential-accessed directory pointer to sequence through the directory locations automatically to receive the mneumonic information stored in successive ones of the directory locations to cause thereby voice synthesizer 402 to generate signals which, once amplified, are converted into the aural signals by speaker 438. When a desired directory location is accessed, the user of apparatus 300 releases key 330, and then depresses the send key 312 to initiate telephone dialing of the telephone number stored in the then-accessed directory location. Scrolling through the directory locations is similar to that as illustrated in FIGS. 4A–4D.

Alternately, when selected ones of the directory locations form sets, similar to sets 220 and 230 of FIGS. 5 and 6, rather than sequentially accessing each directory location prior to initiate telephone dialing of a desired one of the telephone numbers, key 318 or key 324 is depressed to cause actuation of the key formed thereof. The number of directory locations grouped together to form sets 220 or 230 is preferably of a small number, and, as illustrated, sets 220 and 230 are each comprised of three directory locations. The small number of directory locations permits a user to learn quickly and to remember the contents of the directory locations, i.e., the number of directory locations is such that the user is familiar with the telephone numbers stored therein. Two keys (keys 318 and 324) access two sets of directory locations as, typically, two users frequently operate automotive vehicles.

Operation of key 318 will be described with respect to set 220 of FIG. 5. Three directory locations, directory locations 200-1, 200-5, and 200-N are selected to form set 220. Typically, the telephone numbers stored in the directory locations forming set 220 are telephone numbers most frequently dialed by the user of apparatus 300. Depression of key 318 causes actuation of the switch formed thereof to cause generation of an interrupt-access input signal generated on line 354 and applied to processor 378. Depression of key 318 causes processor 378 to position an interrupt-access directory pointer at directory location 200-1. Depression of key 318 only one time within a predetermined time period causes processor 378 to initiate automatic dialing of the telephone number stored in the first directory location of set 220. If, conversely, key 318 is depressed two times within a predetermined time period, the interrupt-access input signal generated on line 354 is generated two times, and such signal generation is detected by processor 378. When the switch formed of key 318 is actuated two times within the pre-determined time period, the interrupt-access directory pointer is positioned at the second directory location, here directory location 200-5, of set 220, and the processor initiates automatic telephone dialing of the telephone number stored in the second directory location of the set.

Similarly, if key 318 is depressed three times within the predetermined time period, the interrupt-access input signal is generated three times on line 354, and, hence, applied to processor 378 three times during the predetermined time period. Processor 378 is operative, in such instance, to position the interrupt-access directory pointer at the third directory location of set 220, and to initiate automatic telephone dialing of the telephone number stored within the third one of the directory locations of set 220. Preferably, telephone dialing may be effectuated here without actuation of the send key.

Operation of key 324 is similar to that of key 318. Depression of key 324 actuates a switch formed thereof to cause generation of an interrupt-access input signal on line 360 which is applied to processor 378. Actuation of the switch formed thereof during a predetermined time period causes an interrupt-access directory pointer to be positioned at the first directory location, here directory location 200-1 of set 230. Automatic telephone dialing of the telephone numbers stored therein is initiated by processor 378. Similarly, depression of key 324 two times during the predetermined time period causes the interrupt-access directory pointer to be positioned at the second directory location of set 230, and to initiate automatic telephone dialing of the telephone numbers stored thereat. Depression of key 324 to cause actuation of the switch formed thereof three times during the predetermined period also causes the interrupt-access directory pointer to be positioned at the third directory location, here directory location 200-N-3 to cause processor 378 to initiate automatic telephone dialing of the telephone numbers stored thereat. Each time that a user depresses either key 318 or 324, an aural indication of such depression is generated by speaker 438. An algorithm embodied within processor 378 generates signal on bus 400 which are supplied to 402 to cause a signal generated thereby, once amplified, to drive speaker 438. For instance, depression of key 318 one time during the predetermined time period causes a single, short-duration tone (i.e., a "beep") to be generated by speaker 438. Depression of key 318 two times within the predetermined time period causes similar operation of processor 378, but in this instance, two, short-duration tones (i.e., two "beeps") to be generated by speaker 438. And, depression of key 318 three times within the predetermined time period causes three, short-duration tones (i.e., three "beeps") to be generated by speaker 438.

An indication of the number of times in which key 324 is depressed may be similarly indicated. A different frequency tone, may, of course, be caused to be generated upon actuation of the switch formed of key 324.

Because a small number of directory locations, and, hence, telephone numbers formed of sets 220 and 230, a user may quickly learn the association between the short-duration tones generated responsive to depression of the keys 318 and/or 324. The attention of a user may be directed primarily to operation of an automotive vehicle while, at the same time, initiate telephone dialing of a desired telephone number by the mere depression of a single switch.

Figure 9:
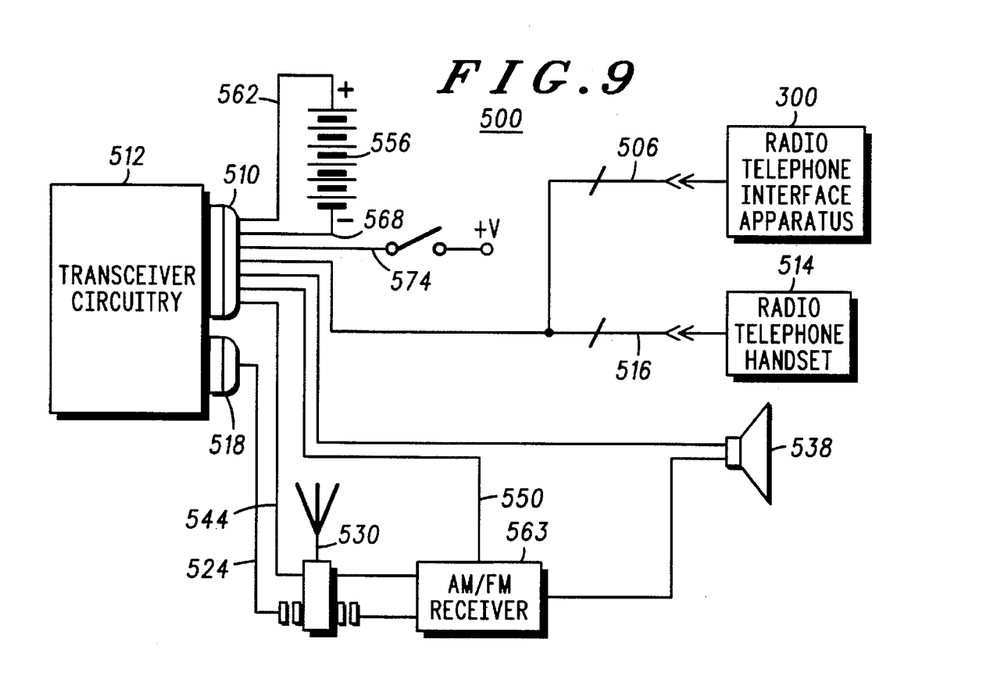
FIG. 9 is a block diagram of a radio telephone constructed according to a preferred embodiment of the present invention.

Turning finally now to the block diagram of FIG. 9, radio telephone interface apparatus 300 is shown connected to form a portion of a transceiver. The transceiver of FIG. 9 is referred to generally by reference numeral 500. The radio telephone interface apparatus is again referred to by reference numeral 300, and is connected by bus 506 input port 510 of transceiver circuitry 512. FIG. 9 also illustrates the connection of a conventional handset 514 to transceiver circuitry 512 by way of bus 516. Transceiver circuitry 512 includes circuitry both to transmit and to receive modulated signals. Individual lines which form bus 506 include lines 462, 468, 474, 492, 498, and bus 400 of apparatus 300 of FIG. 8.

Output port 518 of transceiver circuitry 518 is coupled by line 524 to antenna 530. Antenna 530 is additionally coupled to a conventional automotive-vehicle receiver, here AM/FM radio receiver 536. Both transceiver circuitry 512 and radio 536 are coupled to speaker 538. Speaker 538 of FIG. 9 corresponds to speaker 438 of FIG. 8. Transceiver 512 is additionally coupled to antenna and to radio 536 by way of lines 544 and 550, respectively. Additionally, transceiver circuitry 512 is powered by way of connection to power source 556 (typically, an automotive battery power supply) by way of lines 562 and 568. A switched connection permitting switch to operation of transceiver 500 is permitted by an input supplied on line 574 which is coupled to an ignition switch of an automotive vehicle.

When the operator of the automotive vehicle desires to initiate telephone dialing of a telephone number, desired ones of the keys of radio telephone interface apparatus 300 are actuated. Signals generated on bus 506 are supplied to transceiver circuitry 512 which generates modulated signals indicative thereof on line 524 which are transmitted by antenna 530 to initiate telephone dialing to a remote base station. As only a quite limited number of keys are disposed upon key pad 306 of interface apparatus 300 are required to be depressed to initiate telephone dialing of a telephone number, the attention of the operator of the automotive vehicle may be directed primarily to operation of the vehicle and not to the dialing of the telephone number.

While the present invention has been described in connection with the preferred embodiments shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. An interface apparatus for a transceiver of a radio telephone for speed-dialing telephone numbers to effectuate a telephonic communication link with a remote location defined by specific ones of the telephone numbers, the interface apparatus comprising:

a main directory having a plurality of main directory locations, each one of the plurality of main directory locations containing a mnemonic and a corresponding telephone number;

a plurality of subdirectories, each one of said plurality of subdirectories containing a subset of the plurality of main directory locations assigned by a user to include any of said plurality of main directory locations, said subset of the plurality of main directory locations being ordered for access by a user in a user assigned order and wherein each one of said plurality of main directory locations can be assigned to more than one of said plurality of subdirectories;

a processor operatively coupled to said main directory, said subdirectories, and the transceiver to:
(a) generate a sequential-access directory pointer for sequentially accessing the main directory locations of the main directory; and
(b) generate an interrupt-access directory pointer for non-sequentially accessing any of the main directory locations which form the subset of the main directory locations;

a sequential-access actuation switch actuatable to cause sequential accessing by the sequential-access directory pointer of the main directory locations; and an interrupt-access actuation switch actuatable to cause non-sequential accessing by the interrupt-access directory pointer of the main directory locations; and wherein said processor transmits the telephone number accessed by either of said sequential-access actuation switch or said interrupt-access actuation switch to effectuate thereby the telephonic communication link with the remote location.

2. The interface apparatus of claim 1 further comprising a perceptible sensory element operatively coupled to said processor to display the mnemonic contained in the main directory location accessed by said sequential-access actuation switch or said interrupt-access acutation switch.

3. The interface apparatus of claim 2 wherein said perceptible sensory element comprises an aural sensory element.

4. The interface apparatus of claim 3 wherein said aural sensory element further comprises a voice synthesizer for generating a voice signal corresponding to the mnemonic contained in the main directory location accessed by said sequential-access actuation switch or said interrupt-access actuation switch.

5. The interface apparatus of claim 1 wherein said apparatus further comprises a memory element having memory locations forming said plurality of main directory locations and said user assigned subset of main directory locations of said subdirectories.

6. The interface apparatus of claim 5 wherein the memory locations forming said plurality of main directory locations and said user assigned subset of main directory locations are accessed by the user in a manner sequentially perceptible by the user.

7. The interface apparatus of claim 6 wherein the user accesses one of said plurality of memory locations of said main directory as well as the mnemonic and the telephone number stored therein each time said sequential-access actuation switch is actuated.

8. The interface apparatus of claim 7 wherein the user accesses each of said plurality of memory locations of said main directory for a pre-determined period of time when said sequential-access actuation switch is actuated continuously for at least a threshold period.

9. The interface apparatus of claim 6 wherein a first of said user assigned subset of main directory locations of a first one of said subdirectories is accessed when said interrupt-access actuation switch on said input device is actuated one time within a pre-determined time period.

10. The interface apparatus of claim 9 wherein a second of said user assigned subset of main directory locations of a first one of said subdirectories is accessed when said interrupt-access actuation switch is actuated two times within the pre-determined time period.

11. The interface apparatus of claim 10 wherein a third of said user assigned subset of main directory locations of a first one of said subdirectories is accessed when said interrupt-access actuation switch is actuated three times within the predetermined time period.

12. A radio transceiver unit comprising:

receiver circuitry and transmitter circuitry;

a memory element forming a main directory, having a plurality of main directory locations each for storing a mnemonic and a corresponding telephone number, and a plurality of subdirectories, each one of said plurality of subdirectories having a subset of the plurality of main directory locations assigned by a user to include any of said plurality of main directory locations, said subset being ordered for access by a user in a user assigned order and wherein each one of said plurality of main directory locations can be assigned to more than one of said plurality of subdirectories;

a processor for:
  a) generating a sequential-access directory pointer which sequentially accesses main directory locations of the memory element;
  b) generating an interrupt-access directory pointer which non-sequentially accesses any of the main directory locations which form the subset of the main directory locations; and
  c) retrieving said mnemonic and said corresponding telephone number stored in the main directory location accessed;

a sequential-access switch coupled to said processor wherein actuation by a user thereof causes said processor, using said sequential access directory pointer, to sequentially access one of said plurality of main directory locations of said main directory in a user perceptible manner;

a plurality of interrupt-access switches, each corresponding to said plurality of subdirectories, coupled to said processor wherein actuation by a user thereof causes said processor, using said interrupt-access directory pointer, to non-sequentially access one of said main directory locations in a user perceptible manner; and an output device to supply said telephone number retrieved by said processor to the transmitter circuitry to effectuate thereby the telephonic link with the remote location.

13. An interface apparatus, interfacing with transceiver circuitry of a radio telephone for speed-dialing a telephone number to effectuate a telephonic communication link with a remote location defined by the telephone number, said interface apparatus comprising:

a memory element forming a main directory, having a plurality of main directory locations each for storing a mnemonic each corresponding to a telephone number, and a plurality of subdirectories, each subdirectory having a subset of the plurality of main directory locations assigned by a user to include any of said plurality of main directory locations, said subset being ordered for access by user in a user assigned order wherein each one of said plurality of main directory locations can be assigned to more than one of said plurality of subdirectories;

a processor for:
  a) generating a sequential-access directory pointer which sequentially accesses main directory locations formed of the memory element responsive to application of a first signal to an input of said processor;
  b) generating an interrupt-access directory pointer which non-sequentially accesses any of the main directory locations of said subset of main directory locations responsive to application of a second or a third signal applied to an input of said processor; and
  c) retrieving said mnemonic and corresponding telephone number stored in the main directory location accessed;

a sequential-access switch coupled to an input to said processor wherein actuation by a user thereof forms the first signal to cause sequential accessing of one of said plurality of main directory locations of said main directory in a user perceptible manner;

a first interrupt-access switch coupled to an input to said processor wherein actuation by a user thereof forms the second signal to cause non-sequential accessing of main directory locations formed by a first of said subset of main directory locations;

a second interrupt-access switch coupled to an input to said processor wherein actuation by a user thereof forms the third signal to cause non-sequential accessing of main directory locations formed by a second of said subset of main directory locations; and an output device operatively coupled to said processor to the transceiver circuitry to effectuate thereby the telephonic link with the remote location.

14. A method of accessing a telephone number from among frequently called telephone numbers by a user to effectuate a telephonic link to a remote location, the method comprising the steps of:

(a) storing each one of a plurality of mnemonics and associated telephone numbers in a corresponding one of a plurality of main directory locations of a main directory;

(b) assigning a subset of the plurality of main directory locations from said plurality of main directory locations to each of a plurality of subdirectories, said subset of main directory locations corresponding to frequently called telephone numbers by the user and ordered for access by the user in a user assigned order and wherein each one of said plurality of main directory locations can be assigned to more than one of said plurality of subdirectories;

(c) generating a sequential-access directory pointer, in response to actuation of a sequential-access actuation switch by the user, for sequentially accessing the main directory locations of the main directory;

(d) generating a interrupt-access directory pointer, in response to actuation of an interrupt-access actuation switch by the user, which non-sequentially accesses any of the main directory locations which form the subset of the main directory locations;

(e) accessing the preferred telephone number corresponding to the plurality of main directory locations in a user perceptible manner; and (f) forwarding the accessed preferred telephone number to a transmitter to effectuate the telephonic link with the remote location.

* * * * *